United States Patent
Chen

(10) Patent No.: US 9,006,982 B2
(45) Date of Patent: Apr. 14, 2015

(54) DAYLIGHT HARVEST LIGHTING CONTROL SYSTEM

(76) Inventor: Juinn Jyi Chen, Flushing, NY (US)

( * ) Notice: Subject to any disclaimer, the term of this patent is extended or adjusted under 35 U.S.C. 154(b) by 583 days.

(21) Appl. No.: 13/337,116

(22) Filed: Dec. 24, 2011

(65) Prior Publication Data

US 2012/0299487 A1    Nov. 29, 2012

Related U.S. Application Data

(60) Provisional application No. 61/483,027, filed on May 5, 2011.

(51) Int. Cl.
*H05B 37/02*    (2006.01)

(52) U.S. Cl.
CPC ........ *H05B 37/0218* (2013.01); *H05B 37/0254* (2013.01); *Y02B 20/46* (2013.01)

(58) Field of Classification Search
USPC ......... 315/307, 308, 149, 153, 151, 152, 150, 315/154, 155, 159, 291
See application file for complete search history.

(56) References Cited

U.S. PATENT DOCUMENTS

| | | | |
|---|---|---|---|
| 5,406,173 A | 4/1995 | Mix et al. | |
| 2008/0079568 A1 | 4/2008 | Primous et al. | |
| 2010/0207532 A1* | 8/2010 | Mans ............................ | 315/158 |
| 2011/0001436 A1* | 1/2011 | Chemel et al. ................ | 315/291 |

FOREIGN PATENT DOCUMENTS

| | | |
|---|---|---|
| CN | 201690352 U | 12/2010 |
| JP | 11355863 A | 12/1999 |
| RU | 93612 U1 | 4/2010 |

OTHER PUBLICATIONS

International Search Report and the Written Opinion of the International Searching Authority dated Aug. 16, 2012 corresponding to PCT/US2012/036803, 7 pp.

* cited by examiner

*Primary Examiner* — David H Vu
(74) *Attorney, Agent, or Firm* — Michael J. Feigin, Esq.; Feigin & Associates, LLC

(57) ABSTRACT

A system wherein a control panel is used to set brightness, select an operation sensor (occupancy or light level), and provide a selection of lights off or reduced light for night conditions. A sensor control mode or a manual control mode may be selected. A sensor module comprises an occupancy sensor and light sensor used to monitor the ambient light at predetermined intervals Absent interrupts from the control panel, the sensor module or the control module, the system is idle. Whenever the system is in an on state, light from light fixtures is adjusted to compliment daylight to produce the user set brightness, thus reducing energy consumption. In an active mode, at least some light remains on, instead of powering off, during periods of system "off". A delay timer provides time until the light is reduced or turned off entirely.

17 Claims, 10 Drawing Sheets

DAYLIGHT HARVEST LIGHTING CONTROL SYSTEM

This application claims priority under 35 U.S.C. 119(e) from provisional patent application Ser. No. 61/483,027 filed on May 5, 2011, the entire contents of which are incorporated herein by reference, for all purposes.

BACKGROUND OF THE INVENTION

1. Field of the Invention

The present invention relates to lighting control systems. More particularly, it relates to lighting control systems which are highly conservative of energy.

2. Background Art

Generally, there have been a variety of lighting control systems that attempt to conserve energy. Sensors monitor a room for activity, and turn off illumination if there is no movement for a predetermined time. Lights are turned on and off in response to whether sufficient light is already available, due to the presence of daylight, and lights are turned on at night.

SUMMARY

It is an object of the invention to provide a light control system with an integrated light sensor, occupancy sensor and dimming control module for a region, typically a room, or for a series of regions or rooms.

It is a further object of the invention to provide a light control system with a simplified control panel that permits setting brightness of lights, selecting an operations sensor, or switching to manual control.

A very significant feature of the invention is to automatically set the light fixtures in accordance with the ambient light (daylight by default) so that the total brightness in an area is consistent with the brightness determined or desired by the user of the system It is another object of the invention to provide a user of a light control system with the freedom of selecting an occupancy sensor or a light sensor for control purposes. The user can change the manner in which lights are turned on or off when people enter or leave a controlled area, or when ambient light is at a level lower or higher than a predetermined brightness.

Another advantageous feature of the invention is that the user can specify that the light fixtures not be completely powered off when the system would otherwise determine that the lights are to be turned off. The user can set a light level by using a control mode setting, when the system is set to be in active mode or "ON". Some lights, as set by the user in the control module, will remain on, even though the system is in an "OFF" mode.

It is still another object of the invention to provide a system that is easily wired without the need to follow detailed wiring diagrams, because all of the signals and data are controlled by a software control system, designated as a "multi signal sequential system" as more fully explained below.

Further, the lines that control the system may be terminated with modular connectors, so that connections can be made simply and efficiently, with no possibility of error. Specifically, in cases where power requirements and local codes allow for it, four connection lines between the control module, the sensor module and the control panel of the system may be connected with modular telephone type jacks that are connected with a single click.

These objects and others are achieved by providing one or more control panels, which are used to set brightness, select an operation sensor, and provide a selection of manual or automatic control. For each control panel a sensor module comprises a light sensor and an occupancy sensor. A control module executes commands from the control panel or panels of the system, and from the corresponding sensor modules. The system may be used with fluorescent, low voltage halogen or LED lighting systems, and regular incandescent lighting by changing the interface in a control module.

Thus, the embodiment described herein is directed to a lighting control system wherein one control panel is used to set brightness, by selecting an occupancy sensor or a light intensity sensor, and to select the status of an off state being a power off state or a reduced light state from fixtures associated with the system, which can be useful for night light applications. A selection of manual or sensor control mode selects between manual operation, without responding to any sensor, should the sensor module be inoperative.

The sensor modules are comprised of an occupancy sensor and a light sensor so as to continuously monitor the ambient light at predetermined intervals such as preferably two seconds. However, any reasonable time interval, typically in the range of one to five seconds may be selected to adjust the responsiveness of the system. For daylight conditions when the light level does not generally change rapidly, a two second interval is considered to be appropriate. The amount of light provided by the lighting fixtures is adjusted to complement the brightness that is set by the user. Approximately ninety-nine percent of the time, the control system is in an idle state and responds only to interrupts generated from the control panel, the sensor module and the system timer at the intervals noted above, to thus cause activation of the control software. This minimizes the use of energy because only the system clock need be active when no interrupts are generated.

A switch on the control panel is used to select the occupancy sensor on the people present side of the switch or the light sensor on the low light part of the switch, thus providing the ability to select a mode for turning on the light fixtures whenever required. Thus, when it is required that the lights be turned on, whenever ambient light level is lower than the brightness set by the user, the low light or photosensor mode is selected. If the user does not want the light on until there are people present in the monitored region, the people present (or occupancy) mode is selected to allow the occupancy sensor to control operation of the system.

The selection of an active mode allows the user to decide whether the light fixture should be completely off when the system goes to an off state. If active mode is selected, some lights are kept on so that the area will not be completely dark. This mode can also be used to protect the lamps, such as fluorescent lamps, from rapid burnout due to frequently being switched on and off. For example if the user selects occupancy mode to operate in an active area where people come and go frequently, the life of the lamps may be reduced. System default is active mode on when the user selects the occupancy sensor and system default is in active mode off when the user selects the light sensor to operate the system. The user can reset or select active mode on or off by simply pressing a button on the control panel.

The control module includes a control for the user to set the amount of light that will remain when active mode is selected to be on. Preferably, this is selected in increments of five percent starting as low as five percent and going as high as full intensity.

Another control in the control module enables the user to select a delay time until the lights are turned off. This is preferably in the range of one to ten seconds to provide adequate time for a user to have light while leaving the area, before lights are turned off.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
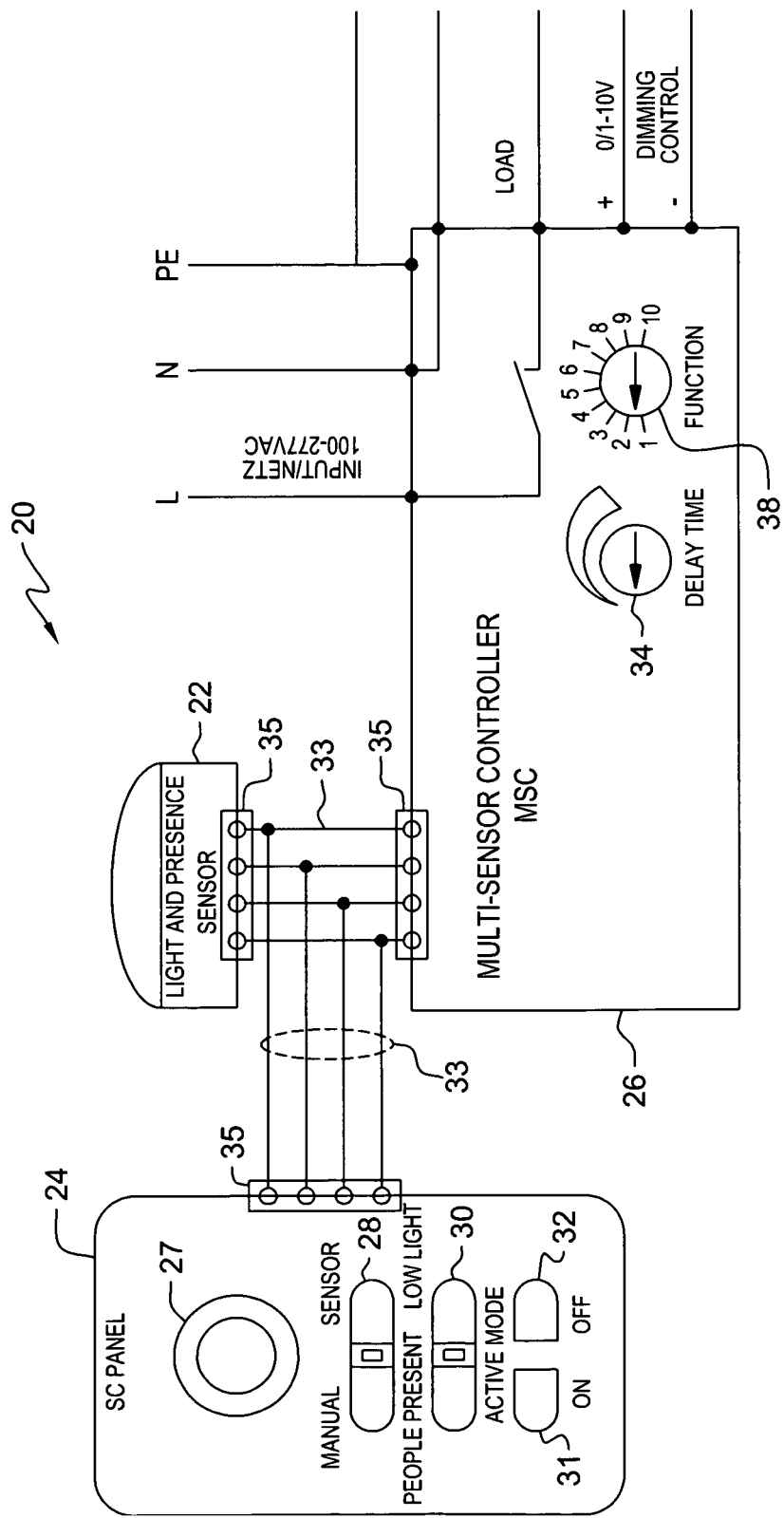
FIG. 1 is a system block diagram of a preferred embodiment.

Referring to FIG. 1, there is shown a high level block diagram of the system 20 in accordance the preferred embodiment. Although the present invention will be described with reference to the embodiments shown in the drawings, it should be understood that the present invention can be embodied in many alternate forms of embodiments. In addition, any suitable type of elements or components could be used.

Figure 4:
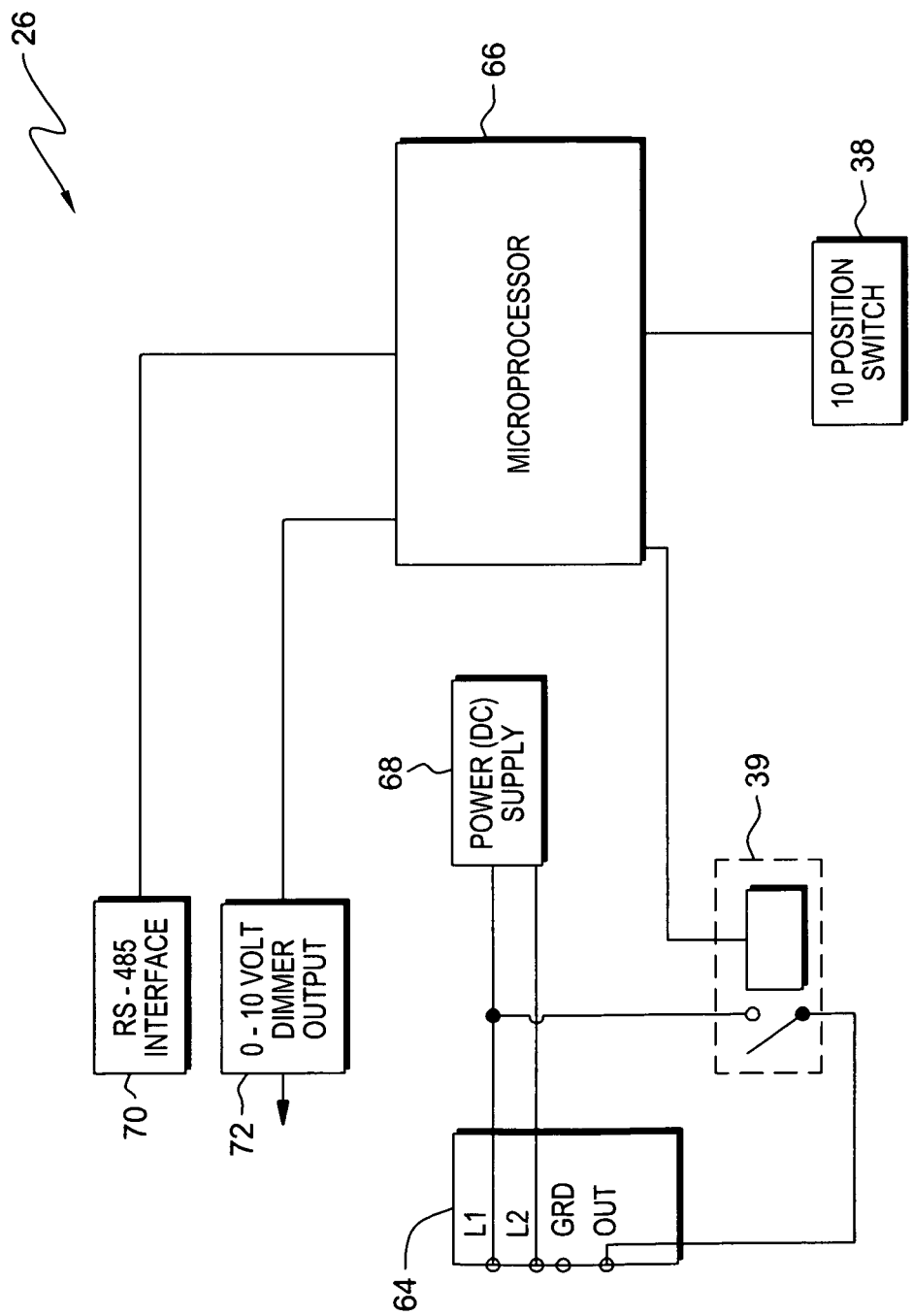
FIG. 4 is a block diagram of a control module used in the system.
Figure 5:
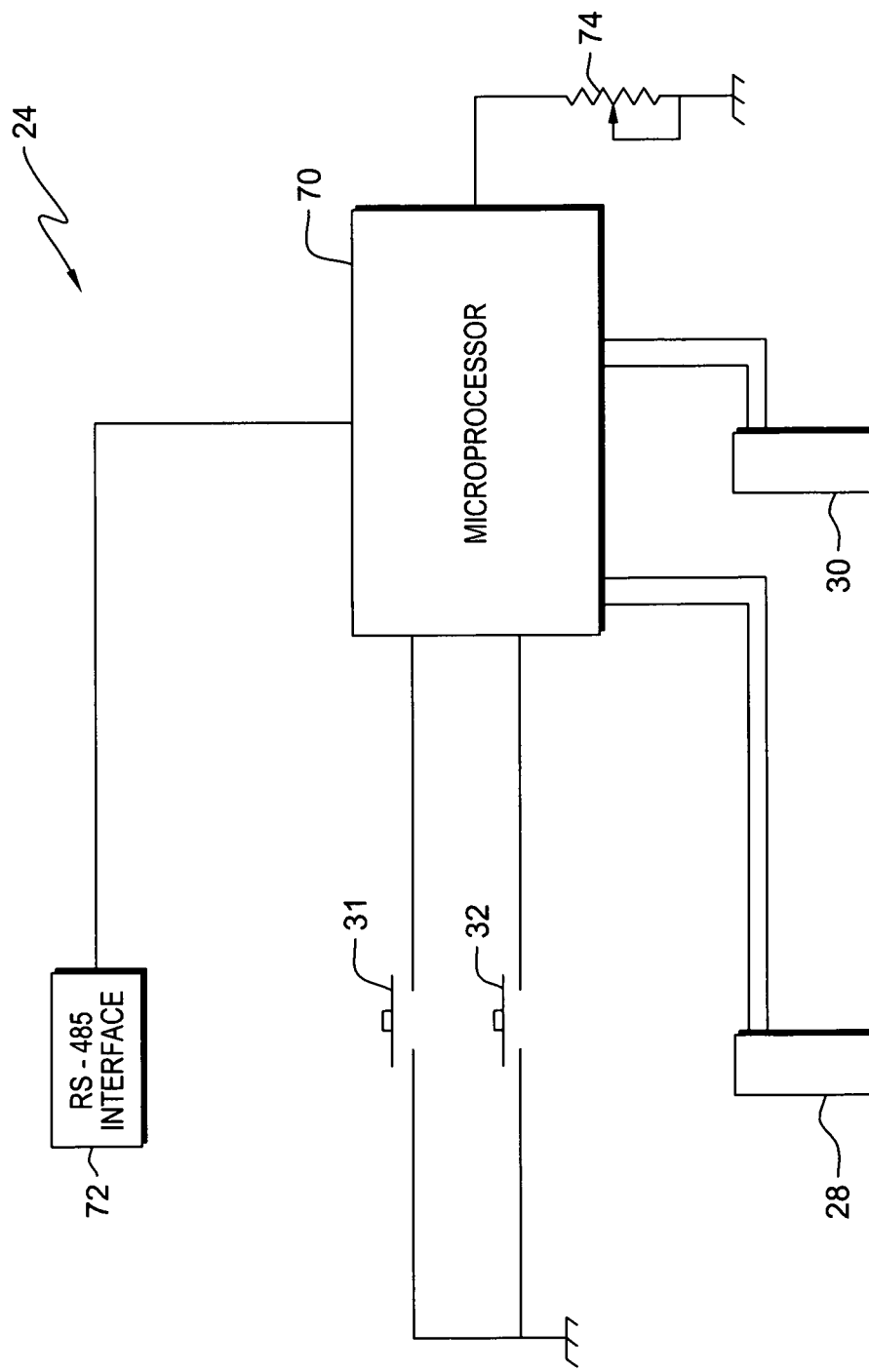
FIG. 5 is a block diagram of a control panel.

FIG. 1 includes a light and occupancy sensor 22 (described more specifically with respect to FIG. 3), a control panel 24 (described more specifically with respect to FIG. 4), and a control module 26 (described more specifically with respect to FIG. 5). Control panel 24 includes an on/off/tune knob 27 which is used to set the brightness of the lighting in the region or room by turning knob 27, a first switch 28 for selecting between manual and sensor control, a second switch 30 for selecting between low light, and sensing people being present (occupancy). When knob 27 is turned to select the desired illumination, the light sensor will monitor the light level, and dim the light or lights if ambient brightness increases and less light is required to maintain the selected level of light.

There are two buttons labeled On 31 and Off 32. These buttons control an active mode, as described below. Light emitting diodes (LED) next to each button indicate whether On or Off has been selected.

Active mode is selected as "on" by system default when the user of the system chooses the occupancy sensor as the mode of operation. The lamps could tend to burn out in a relatively short amount of time as a result of frequently being powered on and off, due to people entering and leaving the area, whenever the system decides to go into Off mode, either when no more activity is detected in the area when the user chooses to use the occupancy sensor, or when the ambient light level is greater than the user determined brightness, and the user selects the photo sensor for controlling operation. Active mode On will assure at least some light from the fixtures instead of them being powered off. The intensity of the remaining light may be set with the switch 38 in control module 26. For example, it may be set at five percent, ten percent, fifteen percent, and up to, for example, and not by way of limitation, fifty percent. Alternatively, the system will be set to a default so that active mode is off, and all lighting fixtures will be powered off. This is set as the default when the user selects the photo sensor as the controlling or operating sensor.

Active mode "on" can also be selected to satisfy a requirement in some projects that require the option of keeping some light on at night. The system offers flexibility in that the user can press on/off buttons 31 and 32 to set or change the state of active mode at any time.

Control module 26 includes a knob 34 for setting a delay timer when the system goes to the off mode as described above. The time may be set by the user, by way of example, and not by way of limitation, to five, ten or fifteen or more seconds to postpone by that amount of time, when the system is brought to the Off mode, either with the active more On or Off. This delay is particularly useful in cases when the user tries to shut down the entire system by, for example, turning knob 27 of control panel 24 all the way back to, for example, its fully counterclockwise position, where a click indicates the system is in an off position. The user has some additional time to look through the area being illuminated for any activity, to be sure it is really a good time to shut off the lights.

Input power of 100 to 277 volts AC is supplied to the system by lines L and N to control module 26, and distributed by those lines. A power line PE is switched on and off by control module 26. A maximum load may be, by way of example and not by way of limitation, 16 amperes, but this depends on the components selected.

A dimming control output of either 0 volts, or a voltage within the range of 1 to 10 volts is supplied as a dimming control output of controller 26. A maximum load may be, by way of example and not by way of limitation, 100 milliamperes, but this also depends on the components selected.

Electronic cables 33, of the type used for modular telephone connections, having "one click" plug and jack connectors 35 may be used for efficient and error free connections of RS-485 signals, or for other connections, as power requirements and local electrical codes permit.

Figure 2:
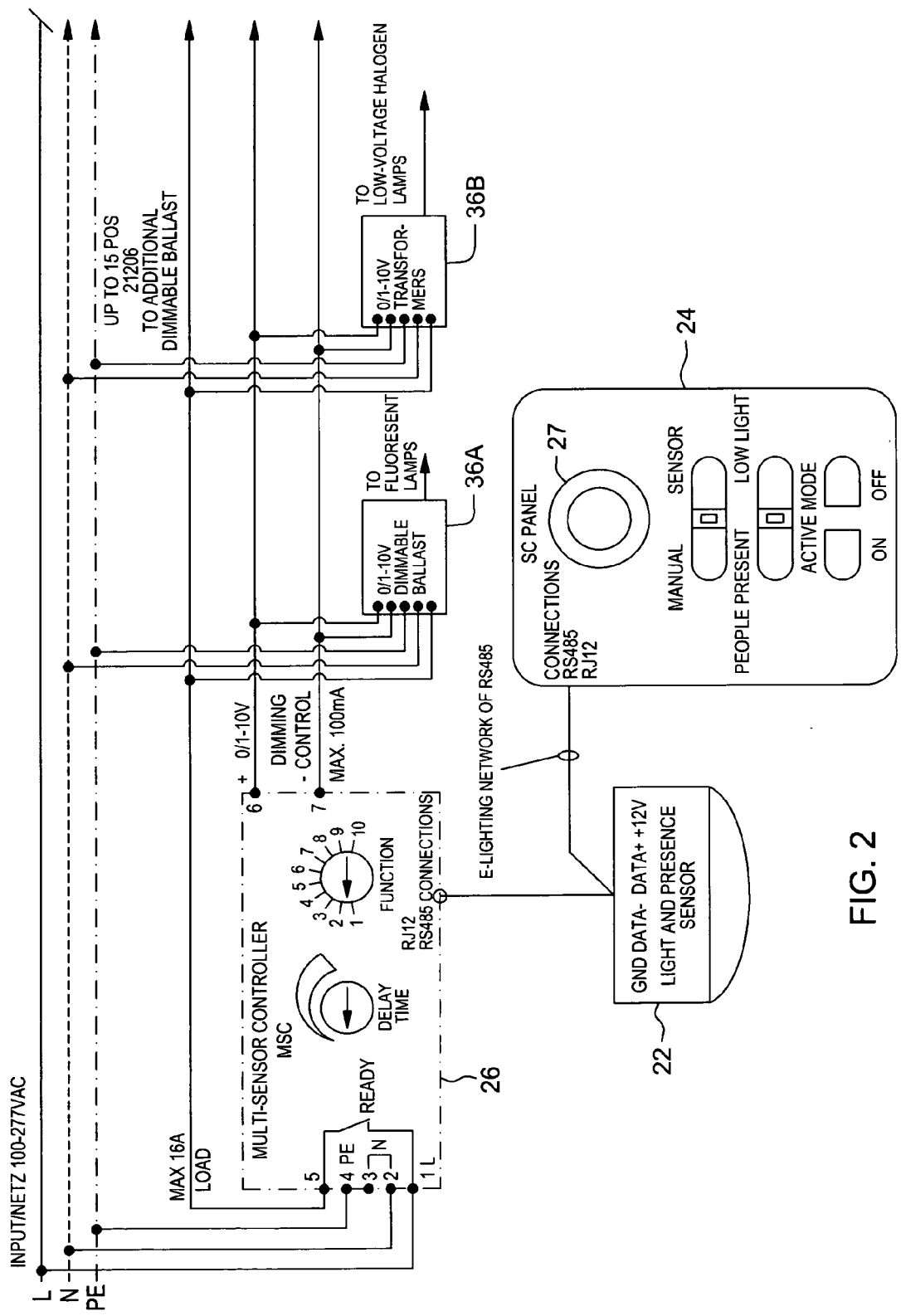
FIG. 2 is a wiring diagram of an embodiment of FIG. 1 with a single sensor module and single control panel.

FIG. 2 illustrates in more detail than FIG. 1, a possible wiring diagram. Light and occupancy sensor 22, control panel 24, and control module 26 are connected by an RS-485 data connection including power, ground, data−, and data+ in a manner well know in the art. As noted above, modular connectors can be used, such as, for example, modular telephone type connectors, so that connections may be made simply and efficiently, with a single click, and without any possibility of error in wiring. Lines L, N and PE distribute power to a series of dimmable ballasts 36A, 36B, etc. Power to line PE is switched by a relay within control module 26. The output of dimmable ballasts 36A, 36B, etc. are controlled by the dimming control voltage from control module 26. The outputs of dimmable ballasts 36A, 36B, etc. are connected to a respective lighting devices or lamps to provide controlled illumination.

Figure 3:
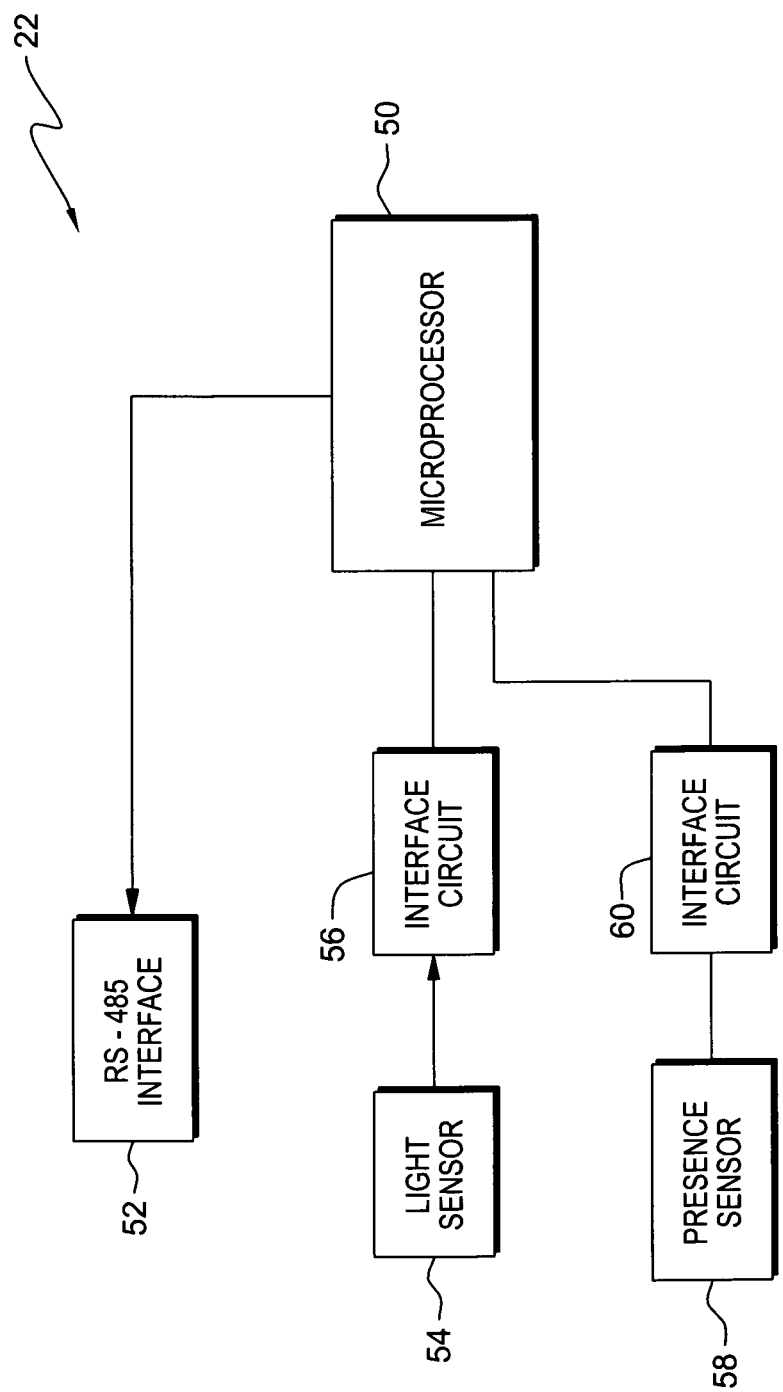
FIG. 3 is a block diagram of a light and occupancy sensor module used in the system.

FIG. 3 is a block diagram of a light and occupancy sensors module 22. A microprocessor 50, such as an ATMEGA48V manufactured by ATMEL Corporation is used to control operations. An RS-485 interface 52 is used for communication to and from the module. A light sensor 54 is operatively connected to microprocessor 50 via a first interface circuit 56.

An occupancy sensor 58 is operatively connected to microprocessor 50 via a second interface circuit 60.

Referring to FIG. 4, and elaborating on the description of FIG. 1 above, a block diagram of the control module 26, line input power is supplied at terminal L1 and L2 of connector 64. Output for distribution is supplied terminal OUT of connector 64. The later is switched by relay 39, which is controlled a microprocessor 66 (which may be an ATMEGA8L manufactured by ATMEL Corporation) via an appropriate transistor (not shown). A D.C. power supply 68 produces the voltages required to operate the remainder of the circuitry of FIG. 6, including RS-485 interface 70 and a dimmer voltage output circuit 72. The ten position switch 38 (as described above with respect to FIG. 1) provides on of ten different digital inputs to microprocessor 66, by controlling the voltage on four inputs of microprocessor 66 to be either zero or one.

An important advantage of the invention is that all electrical connections are easily wired. Since only four wires are used for power distribution and only four for communication via the RE-485 connections, the system lends itself well to the use of modular connectors (such as, by way of example only) those used for modular telephone jacks, thus eliminating the possibility of mis-wiring resulting from the use of individual wires to make the electrical connections. Lighting control occurs in the system firmware, as more fully described below.

FIG. 5 is a schematic diagram of a control panel 24. Operations are controlled by a microprocessor 70 (which may be an ATMEGA8L manufactured by ATMEL Corporation). An RS-485 interface provides communication signals to and from microprocessor 70. Variable resistor 74 is operated by knob 27 to set the timer. Switches 28 and 30 and push button switches 31 and 32 provide inputs for the microprocessor 70 as more fully described below with respect to the flow charts.

Figure 6:
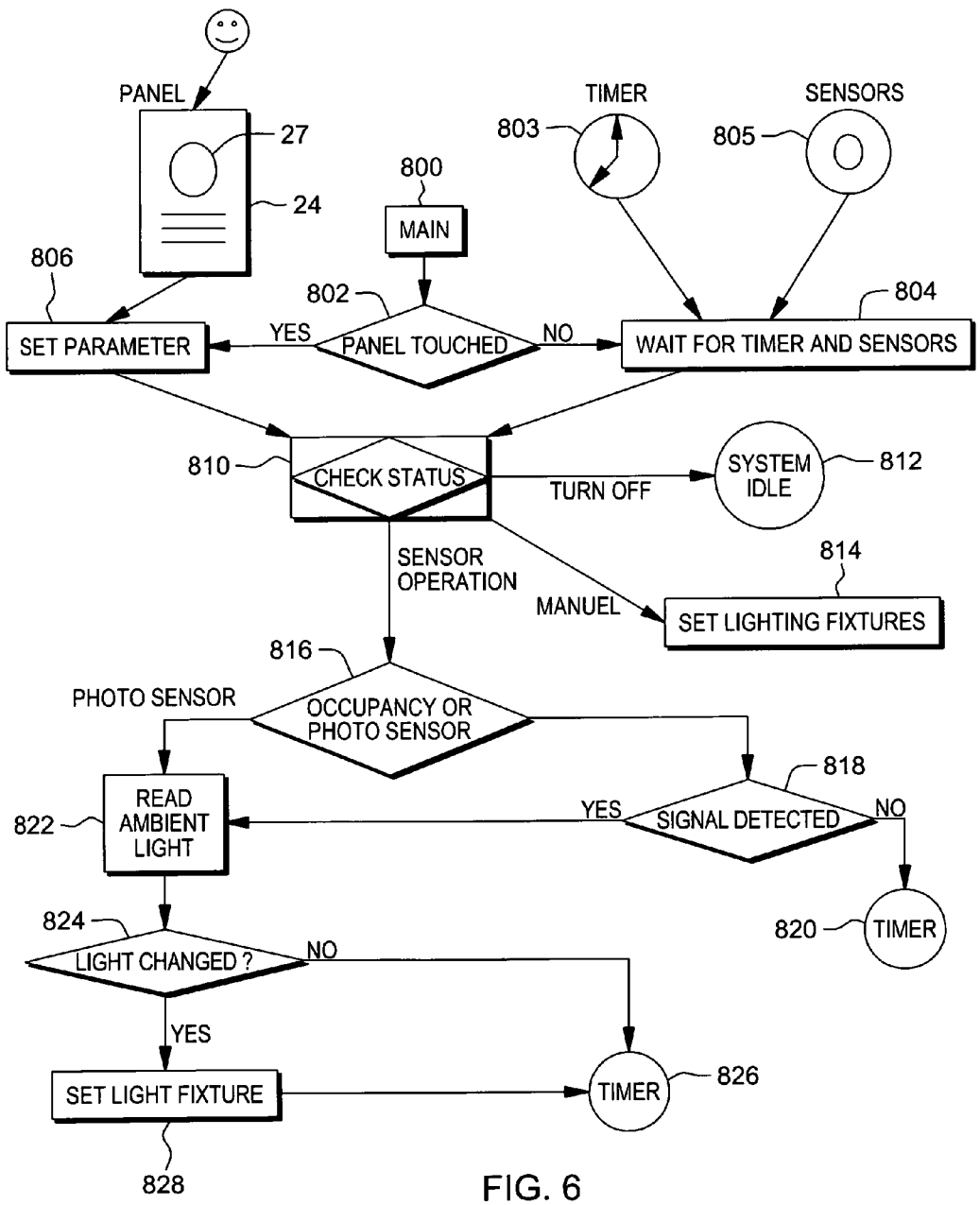
FIG. 6 is a simplified high-level flow chart of the operation of the system.

FIG. 6 is a simplified conceptual flow chart of the overall operation of the lighting system. It is supplemented below by the more details flow charts of FIG. 7 through FIG. 11. In FIG. 6, a main program is started at 800. Monitoring of whether or not a setting on the control panel 24 has been changed occurs at 802. If no setting on the panel have been altered, at 804, the outputs of the timer 803 and sensors 805 of the system are monitored at 804. At 806, monitoring to determine whether a person has used control panel 24 to set the operating parameters of the system is conducted. When parameters are indicated as having been set at 806, or the timer or sensors have provided a signal, a general system status check occurs at 810. If there is a signal for the lights to be turned off, then the system idles at 812. If there is an input signal, if it indicates manual operation, the setting of parameters for the lighting fixture or fixtures is accomplished at 814. Monitoring of whether an occupancy sensor or a light sensor has provided a signal is accomplished at 816. If it was an occupancy sensor, the signal is detected at 818, and a delay timer for how long before the light are turned off is initiated at 820, if no activity is detected in the area. The level of ambient light from the light level sensors is determined at 822. At 824, a determination is made as to whether the light level has changed. If it has not, then a timer is initiated at 826. If it has, the level of illumination from the light fixture or fixtures is adjusted at 828, and the timer is set at 826.

In interpreting the remaining figures, the following symbols will be used:

[LV] refers to ambient light intensity read by the photo sensor.

[LZ] refers to the light intensity value selected by user request.

[AV] indicates that a fraction of the lights are to be on due to active mode being in the On state.

<OS> indicates the state of the occupancy sensor, with a value of 1 indicating the presence of people in a room and a value of zero indicating that the room has no person detected therein.

[LL] indicates calculated light intensity complement value, or the amount of light needed to supplement the ambient light to achieve the illumination level requested by the user.

<AS> indicates that active mode has been selected as On.

<SS> indicates which sensor is being used, with a value of I being the light sensor and a value of zero being the presence or occupancy sensor.

<MS> indicates the position of the auto/manual switch, with a value of 1 indicating the manual mode, and a value of zero indicating the automatic mode.

<OFF> indicates the state of the On/Off switch, with a value of 1 for the system being closed (lights off).

<FS> indicates the value of the flag switch, with a value of one indicating delayed starting.

<DV> is intermediate data loaded with the time value for the timer, indicating the next "time" to bring the system up.

<DZ> indicates the delay time value, set by turning knob 34 of control module 26.

<CS> indicates that lighting fixtures are already in the Off mode (lights off).

Figure 7:
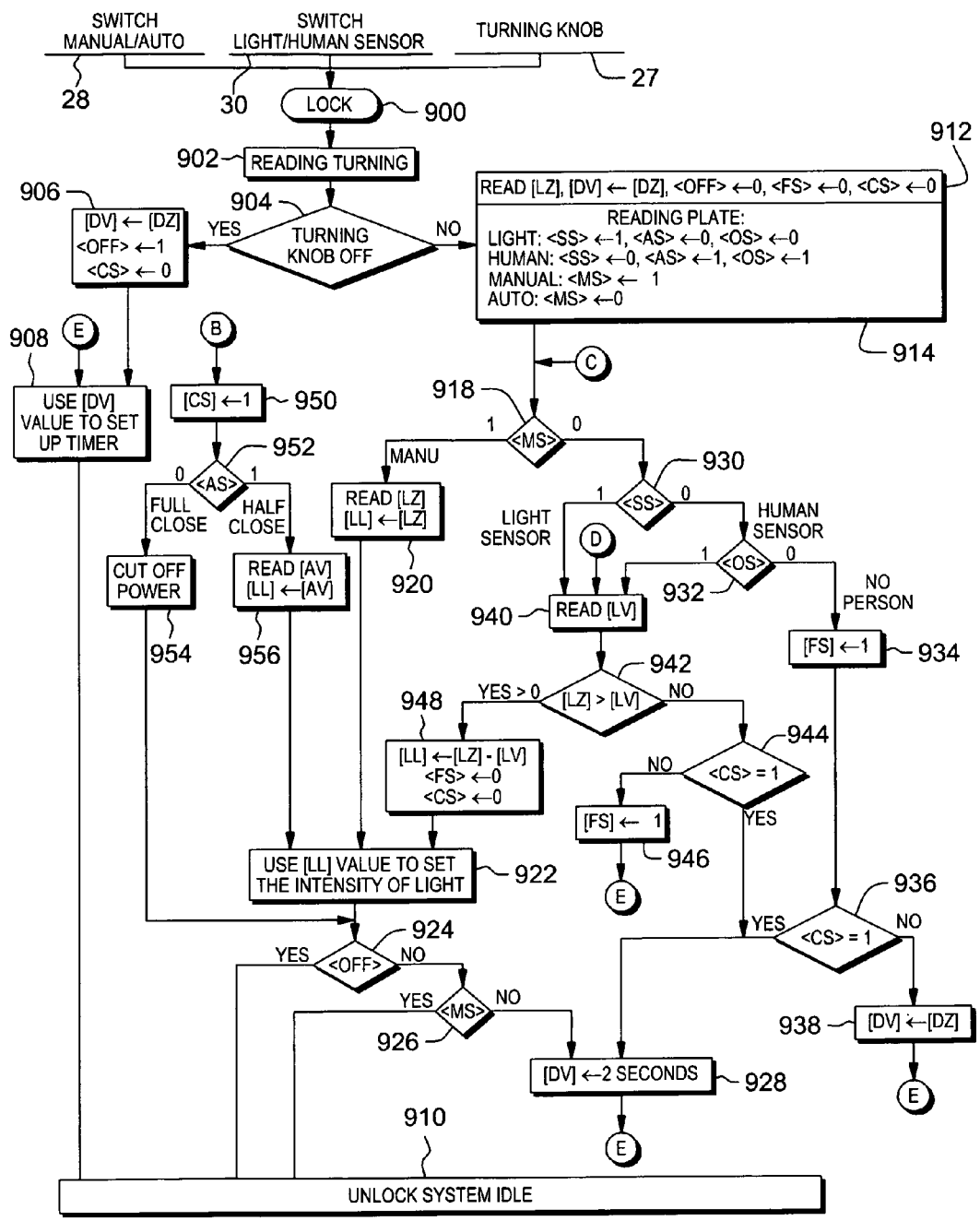
FIG. 7 is a detailed overall flow chart of the operation of the system.

FIG. 7 is a detailed flow chart of the operation of the system. In general, the system is brought up by interrupts generated whenever the knob 27 or a switch on panel 24 changes state, an interrupt is generated by the system timer, or an interrupt is generated by the occupancy sensor, due to activity being detected in the area being monitored. Most of the time, the system is brought up by a system timer every two seconds to check the status and adjust the light level, whenever the system is in the on mode.

At 900, the system is brought to an operational state with signals from the Manual/Auto switch 28, the occupancy/light sensor 30 and the position of knob 27 being taken into account. At 902, the position of knob 27 is read. At 904, a determination is made as to whether the knob 27 has been turned all the way back to off, thus indicating that the user wants to turn off the system. If the answer is YES, then at 906 the system goes to an off state after an amount of time set by the delay timer.

At 908, a value to which the delay time is set is used as the delay time. The value of the flag is also available from other steps labeled E, as more fully described below. Logic flow continues to 910, where the system is unlocked, and goes into an idle mode.

At 904, if the determination is made that the knob 27 has not been turned all the way back to off, thus indicating that the user does not want to turn the system off, the corresponding data is used as light intensity required by the user, and it is loaded as a value for [LZ]. Other parameters and flags are set or preset and read at 912 and 914, in accordance with the settings of switches on the control panel 24. At 918, with respect to switch 28, if the user selects manual mode, <MS> is set to 1. The logic proceeds to 920 to set the lighting fixtures. Otherwise, the logic proceeds to 930 to determine whether the user has selected the photo sensor or the occupancy sensor (switch 30) and the flag <SS> is set accordingly.

In the case of the light sensor being selected the value of the ambient light is read at 940 and the value for [LV] is set. This is compared at 942 to [LZ], the user's request. If more light is needed to meet the user's request, a value for that amount is calculated as a value for complimentary light at 948. Then, at 922, the light for the light fixtures is set up, and a two second delay timer is set. The logic goes to 928 and then to system idle at 910. Every two seconds, the system is brought back up to tune or adjust the amount of light that is required from the lighting fixtures based on the ambient light.

If the occupancy sensor was selected, flag <OS> indicates whether activity is detected in an area being monitored. <OS> is set to 1 when the occupancy sensor brings the system up, and remains set to 1 whenever the system is brought back up by the timer, instead of a signal from the panel 27.

If <OS> shows a value of 1, then proceeding from 944, if <OS> shows 0, then <FS> is set to 1, indicating the beginning of the system delay time off period. At this time, it the system detects the lighting fixtures are already in the off mode (<CS> is equal to 1), the operation of turning of the lighting fixtures has already been executed, then proceeding from step 928, the two second timer is set. Otherwise, proceeding to 938, start delay time off is set up and started.

Figure 8:
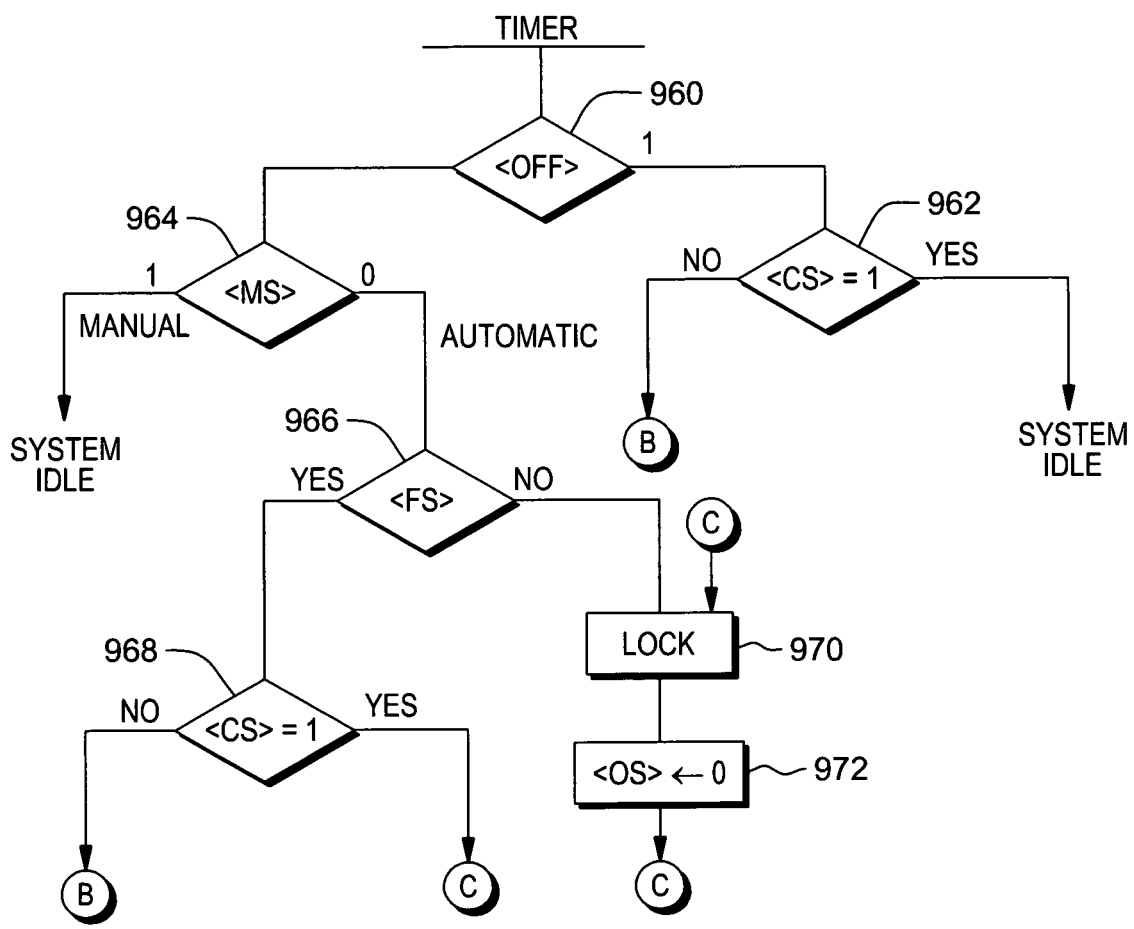
FIG. 8 is a flow chart of the operation of the timer.

It is noted that the flag <FS> is used by the timer flow chart of FIG. 8. While the system is brought back up by the timer (at 966), the timer logic is locked at 970, if it is not in delay time off period. The logic goes to 972 to set <OS> off to indicate there is no activity in the area. Then the logic flows to C (918 of FIG. 7) to execute in accordance with the indicators. If at 966 <FS> indicates that the system is brought back by the timer due to the delay time off period having ended, the value of <CS> is checked at 968. If <CS> indicates that that the lighting fixtures are still on, then the logic goes to B (950 in FIG. 7) to execute turning off the light fixtures. If <CS> indicates that the fixtures are already in the off mode, then the logic goes to G, 970 and 972 to set <OS> off, and to 918 of FIG. 7. The timer will again be reset to resume system operation in two seconds.

The value of <CS> is set to 1 whenever the system off mode is started at 950. This portion of the logic shown in the flow chart executes the active mode On/Off indicated by flag <AS>, which is set to 1 whenever the active mode On switch is set.

If the system is brought up by the timer, reference is made to the flow chart of FIG. 8. Some of this logic has been explained above, and the remainder is self-explanatory.

Figure 9:
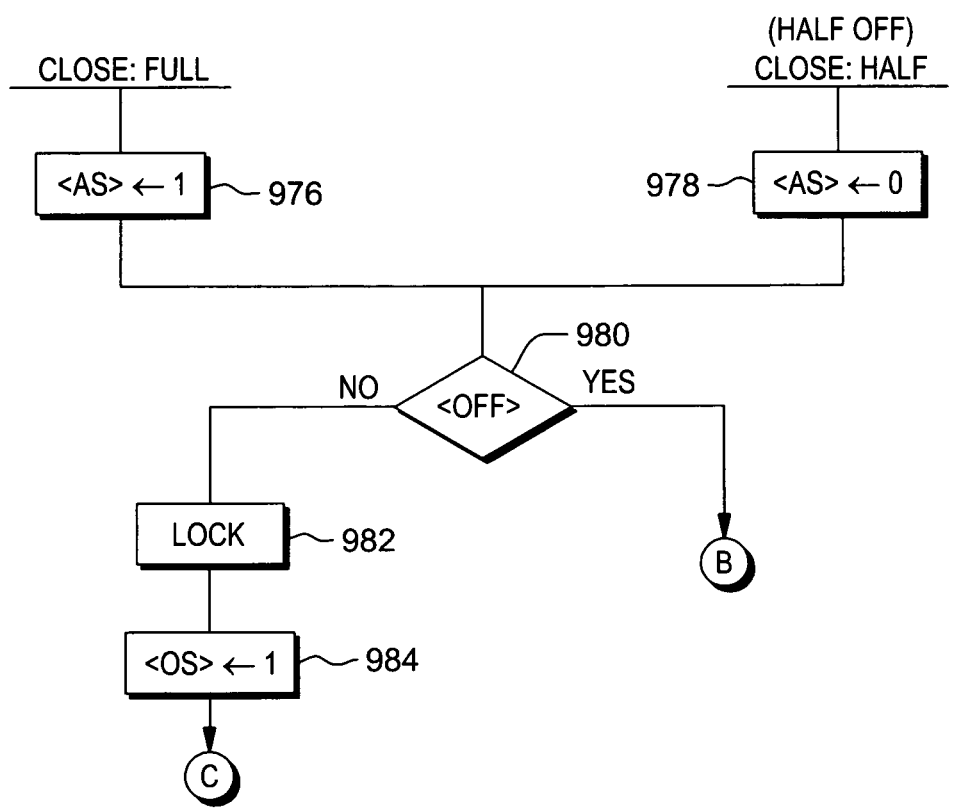
FIG. 9 is a flow chart of the operation of the system in response to selecting active mode On or Off while the system is in Off mode.

If the system is brought up by the active mode On/Off switches, then reference is made to the flow chart of FIG. 9, which is self-explanatory.

Figure 10:
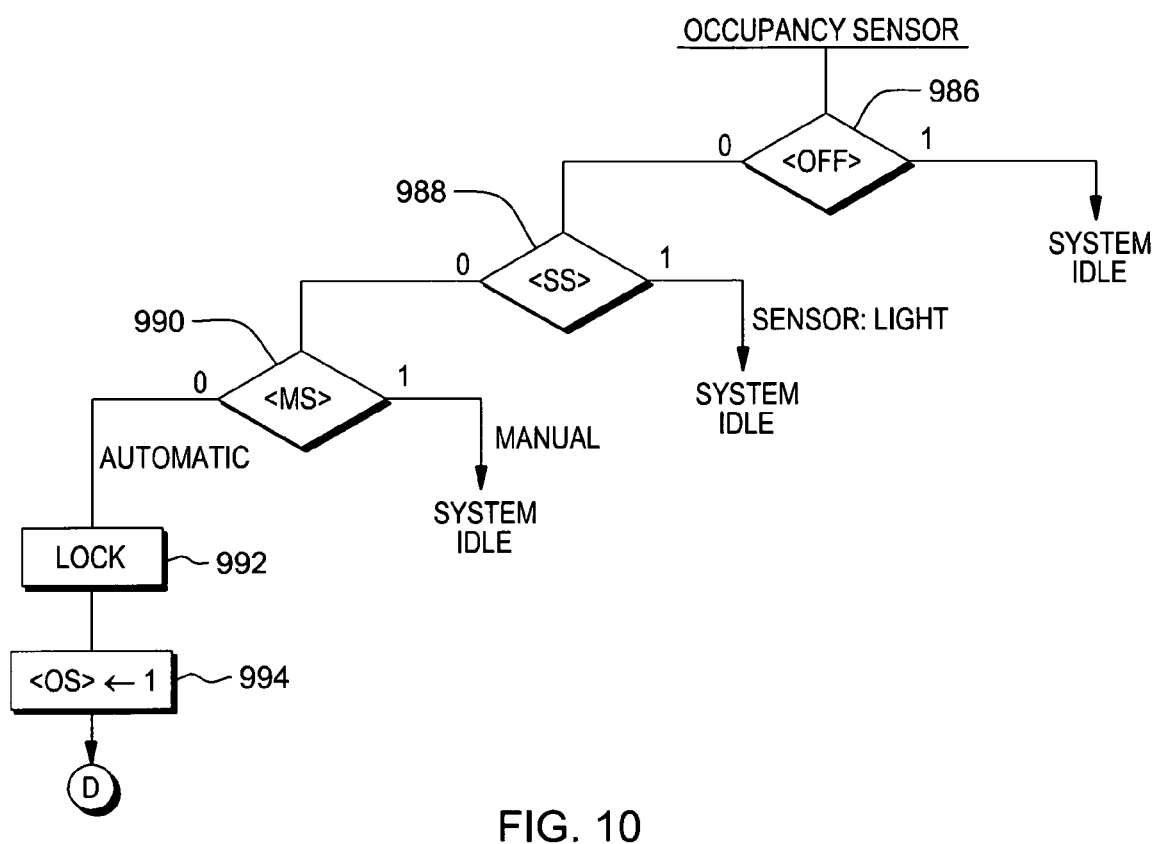
FIG. 10 is a flow chart of the operation of the occupancy sensor.

If the system is brought up by the occupancy sensor, then reference is made to FIG. 10, which sets <OS> to 1 and the logic flow goes to D (step 940 of FIG. 7).

While the description herein is directed to a system with a microprocessor associated with each of the control module, the sensor module and the control panel, it will be understood to those skilled in the art that a single microprocessor may be used, preferably located in, for example, the control module. An interrupt vector representative of signals from the control panel, the sensor module and the control module causes a jump to the address of individual routines that recalled based on the vector. While the precise circuits and interconnections may vary, the principles of operation of the system would be the same as those described herein.

The invention, and the embodiments described herein, in addition to the energy saving features described above, has many additional advantages. The location of the sensor module and the control panel in a given installation, is not critical. Since the user can adjust the light intensity at will. If placed in a shaded area, the light sensor senses less light and turn on more lights on the fixtures. Then, the user simply turns the knob to adjust the light intensity to a lower brightness. If the light sensor is placed in a brighter area, more light is received by the light sensor, and the user can simply turn knob to increase the brightness of the light provided by the lighting fixtures. In summary, the installer does not need to worry too much about how the light sensor is placed, since the user decide the brightness based on the observed light level. The light sensor need only be placed where it can sense the change in the level of daylight illumination. The occupancy sensor can detect people present in a wide region. Thus, the sensor module and control panes may be placed in virtually any location that is convenient for the user.

Generally, one sensor is enough for a large monitored space. The control module may be configured to have either a 10 Ampere or a 16 Ampere capacity which is generally enough to cover a large illumination area. There is no need for multiple sensors since the user decides on the level of brightness from what he see and feels.

Thus, it should be understood that the foregoing description is only illustrative of the invention. Various alternatives and modifications can be devised by those skilled in the art without departing from the invention. Accordingly, the present invention is intended to embrace all such alternatives, modifications and variances, which fall within the scope of the description herein, and the claims below.

What is claimed is:

1. A lighting control system comprising:
a microprocessor for controlling operation of light fixtures connected to the system;
a system timer;
a control panel for controlling at least one light fixture, said control panel including a user operable control for selecting between a manual mode and a sensor operated mode, as well as a user operable control for selecting an active mode on state wherein a fraction of light fixtures connected to the system are kept on even if the system is in an off state;
a control module and a user-operable selector associated with said control module for determining intensity of light provided by said fraction of light fixtures when said active mode on state is selected; and
an occupancy and light sensor for detecting occupancy of a region to be illuminated and light level in said region to be illuminated, wherein the microprocessor is configured to respond to interrupts generated by:
a. the system timer;
b. a change in state of a control on said at least one control panel; or
c. said at least one occupancy and light sensor.

2. The system of claim 1, wherein said control panel includes a user operable control for selecting whether light is supplied by said light fixtures when people are present in a region being illuminated, or light is supplied by said fixtures when ambient light is at a level lower than that set by a user.

3. The system of claim 1, wherein said control panel includes a user-operable control for selecting an active mode wherein the occupancy as detected by the occupancy and light sensor controls the light fixtures, and so that at least some of the light fixtures are on during a night time and no occupancy situation.

4. The system of claim 1, wherein said control panel includes a control for adjusting light level of light from at least one of said light fixtures.

5. The system of claim 1, wherein said control panel includes a control for continuously adjusting light level of light from at least one of said light fixtures.

6. The system of claim 1, wherein said microprocessor is associated with a control module, and control module comprises a first output for supplying power to said light fixtures, and a second output for determining brightness of said light fixtures.

7. The system of claim 1, further comprising a control module, having an adjustable delay timer for determining an amount of time until the system enters a mode in which no light or reduced light is provided by said at least one light fixture.

8. The system of claim 1, wherein said occupancy and light sensor comprises a light detector for reducing intensity of light provided by said at least one light fixture when daylight provides at least a portion of the light intensity that is required.

9. A lighting control system comprising:
a controller module;
an occupancy and light sensor module;
a control panel for controlling at least one light fixture including a user operable control for selecting between a manual mode and a sensor operated mode as well as a user-operable control for selecting an active mode wherein the occupancy as detected by the at least one occupancy and light sensor controls the light fixtures, and so that at least some light is provided by the light fixtures even when no occupancy is detected; and
a user-operable selector for determining intensity of the at least some light provided by said light fixtures when said active mode is selected,
wherein each of said controller modules, said control panel and said occupancy and light sensor module are associated with a separate microprocessor.

10. The lighting system of claim 9, wherein each of said microprocessors has associated with it an RS-485 interface, and communication between said microprocessors takes place via said RS-485 interfaces.

11. The lighting system of claim 9, wherein the controller module comprises a first output for supplying power to light fixtures, and a second output for determining brightness of said light fixtures.

12. The system of claim 9, wherein said control panel includes a user operable control for selecting whether light is supplied by said light fixtures when people are present in a region being illuminated, or light is supplied by said fixtures when ambient light is at a level lower than that set by a user.

13. The lighting system of claim 9, wherein said control panel includes a user-operable control for selecting an active mode wherein the occupancy as detected by the at least one occupancy and light sensor controls the light fixtures, and so that at least some of the light fixtures are on during a night time and no occupancy situation.

14. The lighting system of claim 9, wherein said control panel includes a control for adjusting light level of light from at least one of said light fixtures.

15. The system of claim 9, wherein said control panel includes a control for continuously adjusting light level of light from at least one of said light fixtures.

16. The system of claim 9, wherein electrical connections between the controller module; the control panel; and the occupancy and light sensor module are made with wires connected to modular jacks to allow simple and mistake free connections.

17. A lighting system comprising:
a. a controller controlled by a first microprocessor;
b. a control panel for automatically controlling at least one lighting fixture; and
c. an occupancy sensor and a light sensor for determining occupancy and light level in a region being illuminated by said at least one light fixture; and
d. at least three processors including a first processor associated with said controller, a second processor associated with said control panel, and a third processor associated with said occupancy and light sensor, said at least three processors carrying out parallel processing;
wherein said system operates in one of a plurality of modes, including:
an off mode in which all components of said system are off;
a sensor mode in which control of said at least one light fixture is based on output of said occupancy and light sensor, said sensor mode having a first setting in which said sensor mode is controlled by said light sensor, and a second setting in which said sensor mode is controlled by said occupancy sensor;
an occupancy mode in which said at least one light fixture is on only if said region being illuminated is occupied by at least one person;
an active mode in which at least one of said at least one lighting fixture remains on at a predetermined light reservation percentage regardless of an occupancy state in said region; and
a timer mode in which said at least one lighting fixture is turned off after a delay duration determined by a user; and
wherein system values in said system refresh or are reread from at least one of said controller, said control panel, said occupancy sensor, and said light sensor whenever said controller is reset, said system values including:
light intensity data received from said light sensor;
light intensity set by a user turning a light intensity nob on said control panel;
said light reservation percentage when said system is in said active mode, said percentage being set by a user on said control panel;
a light output intensity required from said at least one lighting fixture when said at least one lighting fixture is on;
a delay duration to be used when said system is in said timer mode; and
a timer duration at which at least one of light sensor status, occupancy sensor status, and control panel status is checked.

* * * * *